United States Patent
Inatomi et al.

(10) Patent No.: US 8,034,484 B2
(45) Date of Patent: Oct. 11, 2011

(54) ELECTROCHEMICAL DEVICE AND ELECTRODE ACTIVE MATERIAL FOR ELECTROCHEMICAL DEVICE

(75) Inventors: Yuu Inatomi, Moriguchi (JP); Mikinari Shimada, Yawata (JP)

(73) Assignee: Panasonic Corporation, Osaka (JP)

( * ) Notice: Subject to any disclaimer, the term of this patent is extended or adjusted under 35 U.S.C. 154(b) by 817 days.

(21) Appl. No.: 10/827,424

(22) Filed: Apr. 20, 2004

(65) Prior Publication Data

US 2004/0214082 A1 Oct. 28, 2004

(30) Foreign Application Priority Data

Apr. 22, 2003 (JP) .................................. 2003-116843

(51) Int. Cl.
*H01M 4/60* (2006.01)
(52) U.S. Cl. ........................................ 429/213; 429/212
(58) Field of Classification Search .................. 429/213, 429/212
See application file for complete search history.

(56) References Cited

U.S. PATENT DOCUMENTS

| | | | |
|---|---|---|---|
| 2,715,778 A | 8/1955 | Murdock | |
| 4,312,992 A | 1/1982 | Green | |
| 4,833,048 A | 5/1989 | Dejonghe et al. | |
| 5,523,179 A | 6/1996 | Chu | |
| 5,833,048 A | 11/1998 | Dilly | |
| 6,110,619 A * | 8/2000 | Zhang et al. | 429/213 |
| 2002/0027415 A1 * | 3/2002 | Fujishita et al. | 313/504 |

FOREIGN PATENT DOCUMENTS

| EP | 1 416 553 A1 | 5/2004 |
|---|---|---|
| JP | 05-074459 | 3/1993 |

OTHER PUBLICATIONS

Stein Jess, The Random House College Dictionary Revised Edition 1979, E section.*
R. Carlier, P. Hapiot, D. Lorcy, A. Robert, A. Tallec; Electrosynthesis and Redox Behavior of Vinylogous TTF Displaying Strong Conformational Changes Associated with Electron Transfers; Electrochimica Acta; 46 (2001) 3269-3277.*
R. Carlier et al., "Electrosynthesis and Redox Behavior of Vinylogous TTF Displaying Strong Conformational Changes Associated with Electron Transfers", Electrochimica Acta 46 (2001) pp. 3269-3277.

* cited by examiner

*Primary Examiner* — Helen O Conley
(74) *Attorney, Agent, or Firm* — McDermott Will & Emery LLP

(57) ABSTRACT

An electrochemical device of the present invention comprises a positive electrode, a negative electrode and an electrolyte, wherein at least one of the positive electrode and the negative electrode includes a compound having a structure represented by the general formula (1):

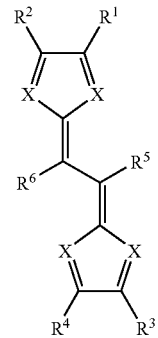

It is thereby possible to obtain a lightweight and high energy-density electrochemical device having an excellent cycle characteristic.

16 Claims, 1 Drawing Sheet

F I G. 1
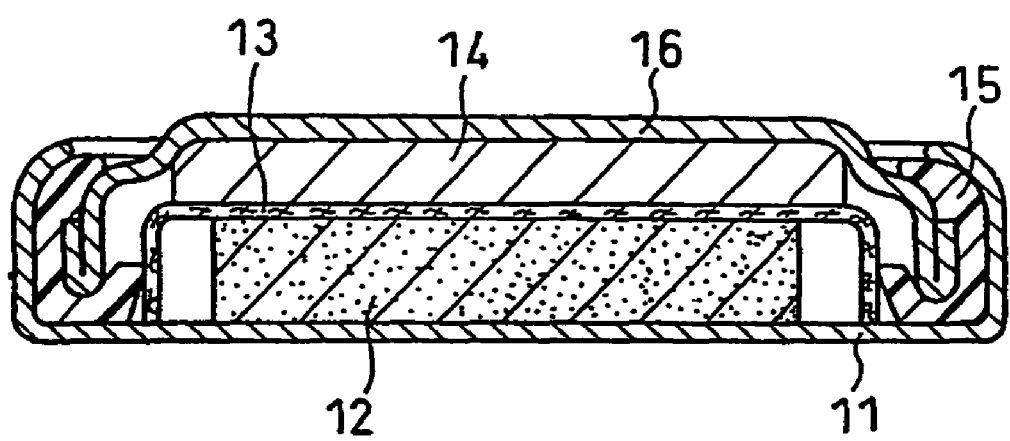

ELECTROCHEMICAL DEVICE AND ELECTRODE ACTIVE MATERIAL FOR ELECTROCHEMICAL DEVICE

BACKGROUND OF THE INVENTION

In recent years, with the development of mobile communication devices and mobile electronic equipments, the demand for power sources thereof have been greatly increased. Since batteries, especially lithium secondary batteries that can be repeatedly charged/discharged, have high electromotive force and high energy density so as to be repeatedly used, they have been in extensive use as power sources of mobile electronic equipments and the like.

With the miniaturization as well as size-reduction of mobile electronic equipments, however, the demand is increasingly high for batteries with higher energy density, and the emergence of new electrode materials with higher energy density than conventional materials have been desired. In this background, active efforts are underway to develop new electrode materials with higher energy density that would directly lead to an increase in energy densities of batteries.

In order to fabricate batteries with higher energy density and lighter weight, studies have recently been conducted on the use of organic compounds as electrode materials. Organic compounds are so light as to have a specific gravity of about 1 g/cm$^3$, which is lighter than lithium cobaltate currently in use as a material for lithium secondary batteries. The use of organic compounds as electrode materials therefore allows fabrication of batteries lighter in weight and higher in capacity than conventional batteries.

For example, U.S. Pat. No. 5,833,048 and Japanese Patent No. 2,715,778 (Japanese Laid-Open Patent Publication No. Hei 5-074459) have proposed lithium secondary batteries where an organosulfur compound having a disulfide bond is used as an electrode material. Such an organosulfur compound is most simply represented by: $M^+-^-S-R-S-M^+$. Herein, R represents an aliphatic group or an aromatic group, S represents sulfur, and $M^+$ represents a proton or a metal cation. The above compounds are bonded to each other via the S—S bond through an electrochemical oxidative reaction to give a polymer with a structure of $M^+-S-R-S-S-R-S-S-R-S^--M^+$. The polymer thus produced returns to the original monomers through an electrochemical reduction reaction. In lithium secondary batteries, this reaction is applied to the charging/discharging reaction in secondary batteries.

Further, U.S. patent application Ser. No. 5,523,179 has proposed the use of elemental sulfur as an electrode material.

In either case, however, the problem arises that the materials have low cycle life characteristics although it is possible to achieve high capacity. This is because a recombination frequency is low in the dissociation and recombination of a disulfide bond during the oxidation-reduction reaction of a sulfur-based material. Low recombination frequency means that all reactive portions cannot react even if the material theoretically has high energy density. Therefore, it cannot actually be said that the compounds of the above related art examples are materials having high energy density.

As thus described, in lightweight and high energy-density electrochemical devices using the organosulfur compound having the disulfide site as the electrode reaction site, as an electrode material, the organosulur compound structurally varies remarkably through an oxidation-reduction reaction, raising a problem of a low cycle characteristic. In the light of this, an object of the present invention is to improve a cycle characteristic of a lightweight electrochemical device having high energy density.

BRIEF SUMMARY OF THE INVENTION

An electrochemical device of the present invention comprises a positive electrode, a negative electrode and an electrolyte, wherein at least one of the positive electrode and the negative electrode includes a compound having a structure represented by the general formula (1):

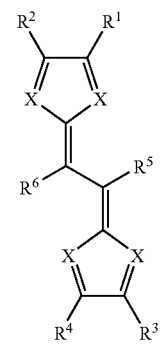

where X is a sulfur atom, a nitrogen atom or an oxygen atom; each of $R^1$ to $R^4$ is independently a linear or cyclic aliphatic group, a hydrogen atom, a hydroxyl group, a cyano group, an amino group, a nitro group or a nitroso group; each of $R^5$ and $R^6$ is independently a linear or cyclic aliphatic group; the aliphatic group includes at least one selected from the group consisting of an oxygen atom, a nitrogen atom, a sulfur atom, a silicon atom, a phosphorus atom, a boron atom and a halogen atom.

It is preferable that the compound be represented by the general formula (2):

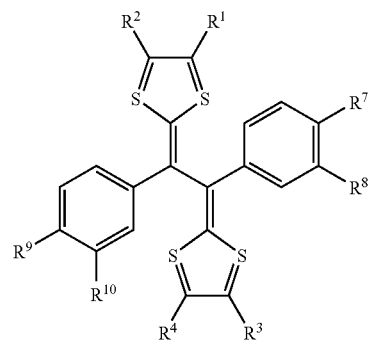

where each of $R^1$ to $R^4$ and $R^7$ to $R^{10}$ is independently a linear or cyclic aliphatic group, a hydrogen atom, a hydroxyl group, a cyano group, an amino group, a nitro group or a nitroso group; the aliphatic group includes at least one selected from the group consisting of an oxygen atom, a nitrogen atom, a sulfur atom, a silicon atom, a phosphorus atom, a boron atom and a halogen atom.

It is preferable that the compound be a polymer compound having more than one structure represented by the general formula (1).

It is preferable that the electrolyte comprises a solvent, and an anion and a cation that diffuse in the solvent, and the compound be capable of forming a coordinate bond with the cation through an oxidation-reduction reaction.

It is preferable that the cation be a lithium ion.

It is preferable that the electrolyte comprises a solvent, and an anion and a cation that diffuse in the solvent, and the compound be capable of forming a coordinate bond with the anion through an oxidation-reduction reaction.

It is preferable that the positive electrode includes the compound as a positive electrode active material, and the negative electrode include a carbon material as a negative electrode active material.

It is preferable that the positive electrode includes the compound as a positive electrode active material, and the negative electrode include, as a negative electrode active material, at least one selected from the group consisting of a lithium metal, a lithium-containing composite nitride, a lithium-containing composite titanium oxide, a silicon-based alloy, and a silicon oxide.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a vertical sectional view of a coin-type cell fabricated in an example of the present invention

DETAILED DESCRIPTION OF THE INVENTION

An electrochemical device of the present invention provides an electric energy by converting an electron transfer through an oxidation-reduction reaction into the electric energy, and comprises a positive electrode, a negative electrode and an electrolyte. At least one of the positive electrode and the negative electrode includes a compound having a structure represented by the general formula (1):

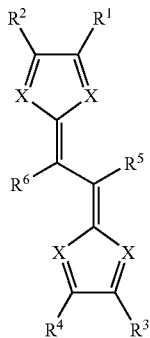

where X is a sulfur atom, a nitrogen atom or an oxygen atom; each of $R^1$ to $R^4$ is independently a linear or cyclic aliphatic group, a hydrogen atom, a hydroxyl group, a cyano group, an amino group, a nitro group or a nitroso group; each of $R^5$ and $R^6$ is independently a linear or cyclic aliphatic group; the aliphatic group includes at least one selected from the group consisting of an oxygen atom, a nitrogen atom, a sulfur atom, a silicon atom, a phosphorus atom, a boron atom and a halogen atom. Hereinafter, the compound may be referred to as "active material compound". The active material compound as an electrode active material brings about an oxidation-reduction reaction within the battery to give and receive electrons.

The active material compound can cause an oxidation-reduction reaction without any significant structural change therein. The mechanism is described below.

The active material compound has a structural symmetry and a planar structure. Further, the active material compound has a carbon-carbon double bond at the center of the molecule thereof, and cyclic structures, including hetero atoms such as sulfur and oxygen. The hetero atoms have lone electron pairs. This causes formation of conjugation by π electrons on the molecule. In the π-electron conjugation portion, having spread over the molecule, electrons can be given and received. This giving and receiving of the electrons proceed as the oxidation-reduction reaction of the active material compound.

For example, in a reductive reaction (discharging reaction), the active material compound is reduced and cations in an electrolyte are coordinated in the reduced molecule. In a subsequent oxidative reaction (charging reaction), the cations having been coordinated in the active material compound are eliminated. This reaction is usable as a battery reaction.

Furthermore, when the active material compound is oxidized in the oxidative reaction (charging reaction), anions in the electrolyte are coordinated in the oxidized molecule. In a subsequent reductive reaction (discharging reaction), the anions having been coordinated in the active material compound are eliminated.

In the above series of oxidative and reductive reactions, there is thought to be no significant structural change of the active material compound, such as dissociation and recombination of the bond. If the molecular structure of the compound significantly changes concomitantly with the oxidation-reduction reaction, another molecular structure change will be required during subsequent reaction, which requires considerable energy. Therefore, no significant structural change of the active material compound through the oxidation-reduction reaction indicates that the effective reaction can be conducted.

As thus described, in the present invention, the compound, whose oxidation-reduction reaction occurs in the π-electron conjugation portion having spread over the molecule, is used as the electrode active material. In the above reaction mechanism, there occurs no significant change of the skeletal structure of the active material through the oxidation-reduction reaction. Accordingly, deterioration in structure of the active material, attributed to repetition of the oxidation-reduction reactions, is suppressed so that an excellent charge/discharge cycle characteristic can be obtained.

Moreover, in the above reaction mechanism, the reaction is expected to proceed more rapidly than dissociation and recombination reaction cause by a conventional organosulfur compounds. When the reaction rate becomes faster, a rate characteristic excellent as a battery characteristic can be expected, and it is thus advantageous for rapid charge/discharge.

As for the compound represented by the general formula (1), a compound represented by the chemical formula (3):

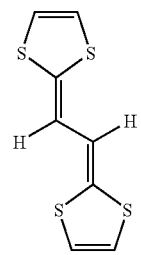

and a compound represented by the chemical formula (4):

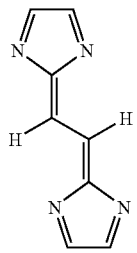

are preferred. Since those compounds have the smallest molecular weight among the compounds represented by the general formula (1), the active materials thereof have the highest energy density, and hence an electrochemical device having high energy density can be obtained.

Further, in the viewpoint of obtaining a faster electrode reaction rate, it is preferable that the active material compound be a compound represented by the general formula (2):

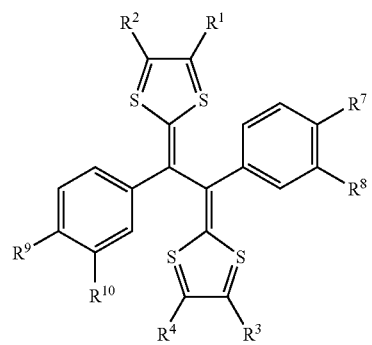

where each of $R^1$ to $R^4$ and $R^7$ to $R^{10}$ is independently a linear or cyclic aliphatic group, a hydrogen atom, a hydroxyl group, a cyano group, an amino group, a nitro group or a nitroso group; the aliphatic group includes at least one selected from the group consisting of an oxygen atom, a nitrogen atom, a sulfur atom, a silicon atom, a phosphorus atom, a boron atom and a halogen atom.

The reasons for the faster electrode reaction in the case of the general formula (2) are described below.

In the oxidation-reduction reaction of the compound represented by the general formula (1), electrons are given and received on two five-membered rings and the reaction occurs in two steps. In the oxidation-reduction reaction of the compound represented by the general formula (2), although the reaction is similar to that in the case of the general formula (1), the levels of energy to take electrons out of the two five-membered rings, get closer to each other in the presence of two benzene rings disposed between the two five-membered rings, and thereby a pseudo one step reaction proceeds. This is attributable that the structure obtained by one electron reaction is very similar to the structure obtained by two electrons reaction.

As for the compound represented by the general formula (2), a compound represented by the chemical formula (5):

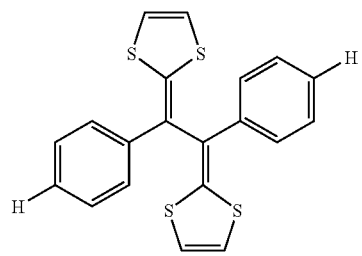

a compound represented by the chemical formula (6):

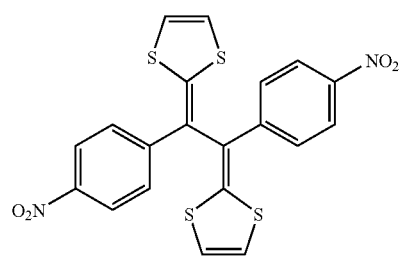

a compound represented by the chemical formula (7):

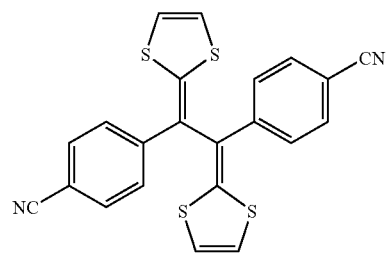

and a compound represented by the chemical formula (8):

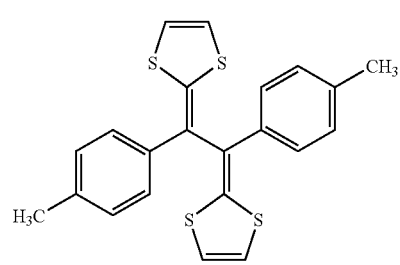

and the like can be mentioned.

Each of $R^1$ to $R^4$ and $R^7$ to $R^{10}$ in the general formulae (1) and (2) is preferably: a nitro group ($NO_2$) so that a high voltage electrochemical device having an excellent charge/discharge cycle characteristic can be obtained; a cyano group (CN) so that a high voltage and high capacity electrochemical device can be obtained; or a methyl group ($CH_3$) so that a high voltage and high capacity electrochemical device excellent in rate characteristic as well as cycle characteristic can be obtained.

As for an aliphatic group used in each of $R^1$ to $R^4$ and $R^7$ to $R^{10}$ in the general formulae (1) and (2), for example, an alkyl group, a cycloalkyl group, an alkoxy group, a hydroxyalkyl group, a thioalkyl group, an aldehyde group, a carboxylic acid group, an alkyl halide group and the like can be cited. The carbon number of the aliphatic group is not particularly limited but is preferably from 1 to 6.

Further, as for the active material compound, any compound including monomer compounds and polymer compound can be used so long as it has a structure represented by the general formula (1). Those compounds can be used singly or in combination of two or more of them.

In the present invention, the polymer compound is defined as a compound, with a molecular weight not less than 10,000, prepared by polymerization of monomer compounds. The polymer compound has a lower solubility in an electrolyte or the like than the monomer compound. In the case of using the polymer compound as the electrode active material, therefore, the dissolving of the active material in the electrolyte is inhibited to further enhance the stability of the cycle characteristic.

As for the polymer compound preferably used is a compound obtained by polymerizing the compounds represented by the general formula (1). Such a compound may be exemplified by one represented by the general formula (9):

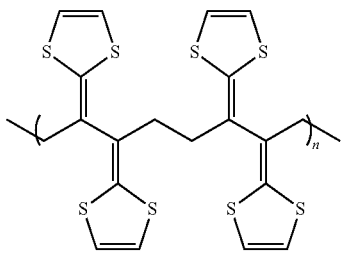

where n is an integer not less than 1. Since this compound is constituted of monomers small in molecular weight, the active material having high energy density can be obtained.

Moreover, as for the polymer compound, a compound having a polyacetylene chain, or a polymethylmethacrylate chain, as a main chain is preferred. It is further preferable that two or more of structures represented by the general formula (1) be included in one molecule. It is preferable that the polyacetylene chain has a molecular weight of 10,000 to 200,000. Such a compound may be exemplified by one represented by the general formula (10):

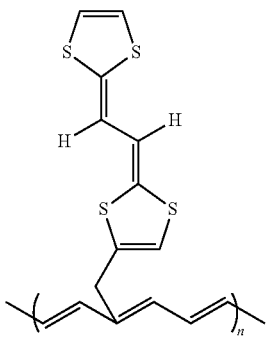

where n is an integer not less than 1.

It is to be noted that the above compounds can be used singly or in combination of two or more of them.

While the active material compound is preferably used as an electrode active material of a secondary battery, among electrochemical devices, it can also be used, for example, for electrodes of primary batteries, electrolytic capacitors, various sensors, electrochromic devices and the like. While these devices have been provided merely as examples, there are a large number of other devices for which the compound can be used.

In secondary batteries, the active material compound can be used in both/either a positive electrode and/or a negative electrode. When this compound is used for one of the electrodes, a conventionally used material can be used for the other of the electrodes as an active material of a secondary battery without any particular limitation.

In the case of using the compound having the structure represented by the general formula (1) as the positive electrode active material, the following can be used as the negative electrode active material: a carbon material such as graphite or amorphous carbon, a lithium metal, a lithium-containing composite nitride, a lithium-containing composite titanium oxide, a composite material of tin and carbon, a composite material of tin and other metals, an alloy of silicon and other metals, a silicon oxide, or the like.

Further, in the case of using the compound having the structure represented by the general formula (1) as the negative electrode active material, the following can be used as the positive electrode active material: a metal oxide such as $LiCoO_2$, $LiNiO_2$ or $LiMn_2O_4$ When the compound having the structure represented by the general formula (1) is used as the electrode active material, a carbon material such as carbon black, graphite or acetylene black, π-conjugated polymer such as polyaniline, polypyrrole or polythiophene, or some other materials may be mixed into the electrode active material as a conductive material to decrease the electrode resistance. Further, as an ion-conductive material, a solid electrolyte comprising polyethylene oxide or the like, or a gel electrolyte comprising polymethyl methacrylate or the like, may be mixed into the electrode active material.

Moreover, a binder may bemused for the purpose of improving a bonding property of constituents of materials in the electrode. As for the binder used can be polyvinylidene fluoride, a copolymer of vinylidene fluoride and hexafluoropropylene, a copolymer of vinylidene fluoride and tetrafluoroethylene, polytetrafluoroethylene, a copolymer of styrene and butadiene, polypropylene, polyethylene, polyimide, polyacrylate or the like.

As for a positive electrode current collector or a negative electrode current collector used can be metal foil, metal mesh, resin containing a conductive filler or the like, which is made of nickel, aluminum, gold, silver, copper, stainless steel, aluminum alloy or the like. By application of carbon or the like onto the current collector, the resistance value of the electrode may be reduced, the current collector may be provided with a catalytic effect, and the current collector and the active material may be chemically or physically bonded to one another.

When a separator is interposed between the positive electrode and the negative electrode, the electrolyte is impregnated into a separator. It is preferable that the electrolyte comprises a solvent and a salt having dissolved in the solvent. Further, the electrolyte itself may be gelated so as to function as a separator. In this case, it is preferable that the electrolyte be impregnated into a matrix of a polymer including polyacrylonitrile, an acrylate unit or a methacrylate unit, a copolymer of ethylene and acrylonitrile, or the like. A cross-linked polymer is preferably used for the matrix.

The preferable examples of the salt to be dissolved in the electrolyte may include halides of alkaline metals such as lithium, sodium and potassium, halides of an alkali earth metal such as magnesium, perchlorate, and salts of fluorinecontaining compounds typified by trifluoromethanesulfonate. Specific examples thereof may include lithium fluoride, lithium chloride, lithium perchlorate, lithium trifluoromethanesulfonate, lithium tetrafluoroborate, lithium bis(trifluoromethylsulfonyl)imide, lithium thiocyanate, magnesium perchlorate, magnesium trifluoromethanesulfate and sodium tetrafluoroborate. Those can be used singly or in combination of two or more of them.

The preferable examples of the solvent of the electrolyte may include organic solvents such as ethylene carbonate, propylene carbonate, dimethyl carbonate, diethyl carbonate, methyl ethyl carbonate, γ-butyrolactone, tetrahydrofuran, dioxolane, sulfolane and dimethylformamide.

It should be noted that a solid electrolyte may be used except for the above electrolyte. As for the solid electrolyte cited can be $Li_2S$—$SiS_2$, $Li_2S$—$P_2O_5$, $Li_2S$—$B_2S_5$, $Li_2S$—$P_2S_5$—$GeS_2$, sodium/alumina ($Al_2O_3$), polyether with an amorphous or low-phase transition temperature (Tg), a copolymer of amorphous vinylidene fluoride-hexafluoropropylene, blends of different polymer or polyethylene oxide.

Next, the present invention is described in detail based on examples. In each example, a coin-type cell was fabricated to evaluate an electrode active material. In the following, a method for preparing a test electrode, a method for fabricating a coin-type cell and an evaluation of battery characteristics are sequentially described.

Example 1

(i) Method for Preparing Test Electrode

The following operation was performed under an argon-gas atmosphere in a dry box equipped a gas purifier.

As an electrode active material used was a compound represented by the chemical formula (3):

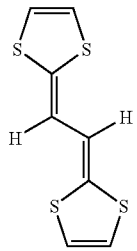

(X was a sulfur atom and each of $R^1$ to $R^4$ was a compound of hydrogen atoms in the general formula (1)). This compound represented by the chemical formula (3) was prepared by oxidative coupling of 1,4-dithiafulvenes, following the non-patent document (the non-patent document: R. Carlier, P. Hapiot et al., Electrochem Acta, 46, 3269-3277, 2001).

30 mg of the compound represented by the chemical formula (3) and 30 mg of acetylene black as a conductive material were mixed to be uniform, which was then added with 1 ml of N-methyl-2-pyrrolidone as a solvent. The obtained mixture was added with 5 mg of polyvinylidene fluoride as a binder for the purpose of binding the active material to the conductive material, which was mixed to be uniform so as to give a black slurry. This slurry was applied on a current collector made of aluminum foil and then subjected to vacuum drying at room temperature for one hour. After the drying, the obtained matter was punched out into a disc with a diameter of 13.5 mm to serve as a test electrode.

(ii) Method for Fabricating Coin-Type Cell

Using the test electrode prepared in the aforementioned method as a positive electrode and lithium metal of 13.5 mm disk (thickness: 300 μm) as a negative electrode, a coin-type cell comprising was fabricated in the following procedure. A vertical sectional view of the obtained coin-type cell is shown in FIG. 1.

First, the test electrode (positive electrode) 12 was disposed on the inner surface of a positive electrode case 11, and a separator 13 comprising a porous polyethylene sheet was disposed on the test electrode 12. Subsequently, an electrolyte was pouring into the positive electrode case 11. The electrolyte was prepared by dissolving 1 mol/L of lithium hexafluorophosphate ($LiPF_6$) in a mixed solvent of ethylene carbonate and diethyl carbonate in a weight ratio of 1:1.

Further prepared was a sealing plate 16, to the inner wall of which metallic lithium (negative electrode) 14 was attached by pressure and in the periphery of which a sealing ring 15 was placed. The metallic lithium 14 was then made opposed to the test electrode 12 and the case 11 was sealed with the sealing plate 16. The open end of the case 11 was crimped on the sealing ring 15 with a pressing machine to obtain a coin-type cell for evaluation.

(iii) Evaluation of Battery Characteristics

The fabricated coin-type cell was charged/discharged at a constant current of 0.133 mA and at a voltage in the range of 2.5 to 4.5 V at an ambient temperature of 20° C. to determine discharge capacities at 1st, 50th, 100th and 300th cycles. Further, an average discharge voltage in respect to an oxidation-reduction potential of lithium ($Li/Li^+$) was determined. As the average discharge voltage used was the average of voltage values in the discharge at the 1st cycle. It is to be noted that there was almost no variation of the discharge voltage until the 300th cycle. The average of all voltage values in the case where a discharge curve has a staircase pattern through a two-steps discharging reaction was also determined. The results are shown in Table 1.

TABLE 1

| | Discharge Capacity (mAh/g) | | | | Average discharge |
|---|---|---|---|---|---|
| | 1st | 50th | 100th | 300th | voltage (E/V vs. $Li/Li^+$) |
| Ex. 1 | 230 | 230 | 230 | 230 | 3.6 |
| Ex. 2 | 140 | 138 | 138 | 137 | 3.7 |
| Ex. 3 | 98 | 98 | 96 | 96 | 3.7 |
| Ex. 4 | 121 | 120 | 120 | 120 | 3.75 |
| Ex. 5 | 127 | 125 | 125 | 125 | 3.75 |
| Com. Ex. 1 | 280 | 20 | 20 | 15 | 2.8 |

Moreover, a charge/discharge rate characteristic was evaluated. Herein, the fabricated coin-type cell was charged/discharged at a constant current of 0.133, 0.665, 1.33 or 2.66 mA and at a voltage in the range of 2.5 to 4.5 V at an ambient temperature of 20° C., and a discharge capacity at the 50th cycle at each of the above current values was determined. The results are shown in Table 2.

TABLE 2

| | Discharge capacity at 50th cycle (mAh/g) | | | |
|---|---|---|---|---|
| | 0.133 mA | 0.665 mA | 1.33 mA | 2.66 mA |
| Ex. 1 | 230 | 230 | 225 | 221 |
| Ex. 2 | 140 | 140 | 138 | 135 |
| Ex. 3 | 98 | 96 | 91 | 90 |
| Ex. 4 | 121 | 120 | 119 | 112 |
| Ex. 5 | 127 | 126 | 126 | 126 |
| Com.Ex. 1 | 20 | 12 | 12 | 11 |

Comparative Example 1

Except that an organosulfur compound of 2,5-dimercapto-1,3,4-thiadiazole (produced by Aldrich) was used as the active material of the test electrode, a coin-type cell was fabricated and then evaluated in the same manner as in EXAMPLE 1. The results are shown in Tables 1 and 2.

Example 2

Except that a compound represented by the chemical formula (5):

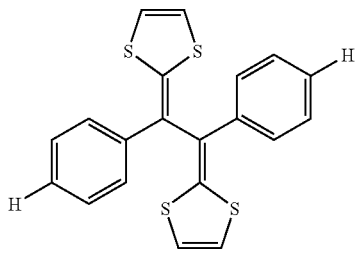

was used in place of the compound represented by the chemical formula (3), a coin-type cell was fabricated and then evaluated in the same manner as in EXAMPLE 1. The results are shown in Tables 1 and 2.

Example 3

Except that a compound represented by the chemical formula (8):

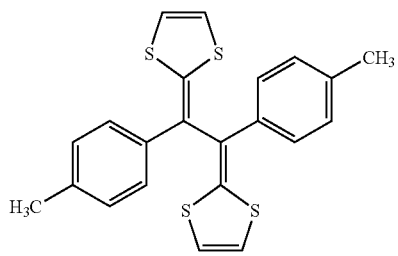

was used in place of the compound represented by the chemical formula (3), a coin-type cell was fabricated and then evaluated in the same manner as in EXAMPLE 1. The results are shown in Tables 1 and 2.

Example 4

Except that a compound represented by the chemical formula (6):

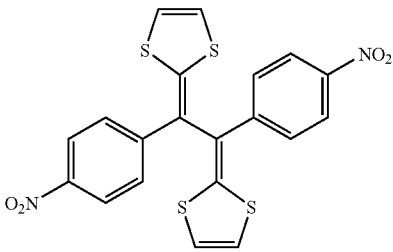

was used in place of the compound represented by the chemical formula (3), a coin-type cell was fabricated and then evaluated in the same manner as in EXAMPLE 1. The results are shown in Tables 1 and 2.

Example 5

Except that a compound represented by the chemical formula (7):

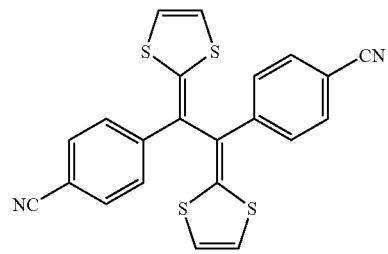

was used in place of the compound represented by the chemical formula (3), a coin-type cell was fabricated and then evaluated in the same manner as in EXAMPLE 1. The results are shown in Tables 1 and 2.

[Consideration of Evaluation]

According to the results shown in Table 1, in COMPARTIVE EXAMPLE 1 where the organosulfur compound having the disulfide site as the electrode reaction site, was used as the electrode active material, although the capacity of 280 mAh/g was obtained in the initial discharge, the capacity decreased by 20 mAh/g until the 50th cycle, and the capacity of only about 15 mAh/g was obtained at the 300th cycle.

On the other hand, in each of EXAMPLES 1 to 5 where the compound having the structure represented by the general formula (1) was used as the electrode active material, a high average discharge voltage of about 3.5 V was obtained and almost no decrease in discharge capacity was observed even at the 300th cycle.

The charging/discharging reaction mechanism of the organosulfur compound having the disulfide site used in COMPARATIVE EXAMPLE 1 is based on the dissociation and recombination reaction of the S—S bond. Since this reaction occurs with low frequency and the charging/discharging reaction causes a large change of the molecular structure, it is unlikely that the S—S bond is recombined. This can be considered a cause of the evaluation result that almost no discharge capacity was obtained at the 300th cycle even though a high discharge capacity was obtained in the initial cycles. It is accordingly found that, in the case of using a compound having a reaction mechanism based on the dissociation and recombination reaction of the S—S bond, an excellent cycle characteristic cannot be obtained.

On the other hand, the compound having the structure represented by the general formula (1), which was used in EXAMPLES 1 to 5 of the present invention, there was observed almost no decrease in discharge capacity even at the 300th cycle. This is presumably because, in the charging/discharging reaction of this compound, anions and cations are just coordinated on molecules and hence the molecular structure does not significantly change, thereby causing no deterioration of the compound itself due to repetition of charging/discharging.

It is found from the above results that the electrochemical device including, as the electrode active material, the compound having the structure represented by the general formula (1) has an excellent cycle characteristic.

Further, as apparent from the results of Table 2, the electrochemical device including, as the electrode active material, the compound having the structure represented by the general formula (1) has an excellent rate characteristic.

Example 6

Next, an example is described where a polymer compound having more than one structure represented by the chemical formula (3) was used as an electrode active material. Herein, as a compound having a polyethylene chain as a main chain and more than one structure represented by the chemical formula (3), there was used a compound represented by the general formula (9):

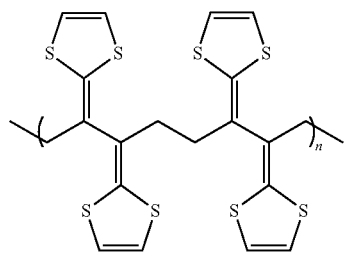

where n=4 to 10 was satisfied.

Except that 40 mg of the compound represented by the general formula (9) was used in place of 30 mg the compound represented by the chemical formula (3), a coin-type cell was fabricated in the same manner as in EXAMPLE 1. Subsequently, the fabricated coin-type cell was charged and discharged at a constant current of 0.133 mA and at a voltage in the range of 2.5 to 4.5 V at an ambient temperature of 20° C. to determine discharge capacities at 1st, 50th, 100th and 300th cycles. The results are shown in Table 3.

TABLE 3

| | Discharge Capacity (mAh/g) | | | | Average discharge |
|---|---|---|---|---|---|
| | 1st | 50th | 100th | 300th | voltage (E/V vs. Li/Li$^+$) |
| Ex. 6 | 135 | 132 | 130 | 130 | 3.7 |
| Ex. 7 | 90 | 88 | 86 | 84 | 3.6 |

Example 7

Next, an example is described where a polymer compound having more than one structure represented by the chemical formula (3) was used as an electrode active material. Herein, as a compound having a polyacetylene chain as a main chain and more than one structure represented by the chemical formula (3), there was used a compound represented by the general formula (10):

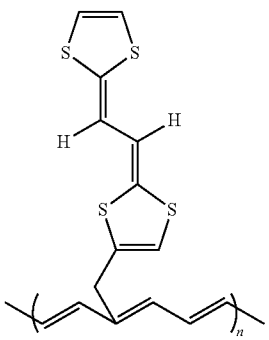

where n=4 to 10 was satisfied.

Except that 40 mg of the compound represented by the general formula (10) was used in place of 30 mg of the compound represented by the formula (3), a coin-type cell was fabricated in the same manner as in EXAMPLE 1. Subsequently, the fabricated coin-type cell was charged and discharged at a constant current of 0.133 mA and at a voltage in the range of 2.5 to 4.5 V at an ambient temperature of 20° C. to determine discharge capacities at 1st, 50th, 100th and 300th cycles. The results are shown in Table 3.

It is found from the results of Table 3 that the electrochemical device, using the polymer compound having more than one structure represented by the general formula (1) as the electrode active material, also exhibits an excellent cycle characteristic.

Example 8

Next, an example is described where a lithium-containing composite nitride was used as the negative electrode. Except that a below-described negative electrode was used, a coin-type cell was fabricated in the same manner as in EXAMPLE 1.

A lithium-containing composite nitride was prepared in such a manner that an alloy of lithium and cobalt in a molar ratio of 2.6:0.4 was put into a copper-made container and held there under a nitrogen atmosphere at 800° C. for two hours so that the alloy was reacted with nitrogen. After the reaction, the resultant black ash colored nitride was pulverized into a powder to be used as a negative electrode active material.

The obtained negative electrode active material powder was subjected to powder X-ray diffraction with CuK α radiation to observe the same hexagonal-based diffraction pattern as that of the lithium nitride (LiN$_3$). This confirmed formation of a single-phase solid solution in such a state as Co had been incorporated into the crystal structure of lithium nitride. The composition of the lithium-containing composite nitride thus synthesized was Li$_{2.6}$CO$_{0.4}$N.

The Li$_{2.6}$CO$_{0.4}$N powder as thus obtained, a carbon powder and a polytetrafluoroethylene powder as a binder were mixed well in a weight ratio of 100:25:5 to give a negative electrode material mixture. This negative electrode material mixture was applied onto a copper sheet, followed by rolling, and the resultant electrode plate was punched out into a disk with a diameter of 13.5 mm to serve as a negative electrode.

For the positive electrode used was the same test electrode as prepared in EXAMPLE 1. The coin-type cell was charged/ discharged at a constant current of 0.133 mA and at a voltage in the range of 2.5 to 4.5 V at an ambient temperature of 20° C. to determine discharge capacities at 1st, 50th, 100th and 300th cycles. The results are shown in Table 4.

TABLE 4

| | Discharge Capacity (mAh/g) | | | | Average discharge |
|---|---|---|---|---|---|
| | 1st | 50th | 100th | 300th | voltage (E/V vs. Li/Li$^+$) |
| Ex. 8 | 230 | 230 | 230 | 228 | 3.05 |
| Ex. 9 | 230 | 228 | 224 | 218 | 2.8 |

Example 9

Next, an example is described where a lithium-containing composite titanium oxide was used as the negative electrode. Except that a below-described negative electrode was used, a coin-type cell was fabricated in the same manner as in EXAMPLE 1.

A powder of LiTi$_5$O$_{12}$ was used as the lithium-containing composite titanium oxide. The LiTi$_5$O$_{12}$ powder, a carbon powder and a polytetrafluoroethylene powder as a binder were mixed well in a weight ratio of 100:25:5 to give a negative electrode material mixture. This negative electrode material mixture was applied onto a copper sheet, followed by rolling, and the resultant electrode plate was punched out into a disk with a diameter of 13.5 mm to serve as a negative electrode.

For the positive electrode used was the same test electrode as prepared in EXAMPLE 1. The coin-type cell was charged/discharged at a constant current of 0.133 mA and at a voltage in the range of 2.5 to 4.5 V at an ambient temperature of 20° C. to determine discharge capacities at 1st, 50th, 100th and 300th cycles. The results are shown in Table 4.

It is found from the results of Table 4 that the electrochemical device, where the compound having the structure represented by the general formula (1) is used as one of the electrode active materials while the lithium-containing composite nitride or the lithium-containing composite titanium oxide is used as the other of the electrode active materials, also exhibits an excellent cycle characteristic.

Example 10

Next, an example is described where the compound having the structure represented by the general formula (1) was used as the active materials of both the positive electrode and the negative electrode. Herein, the compound represented by the chemical formula (7):

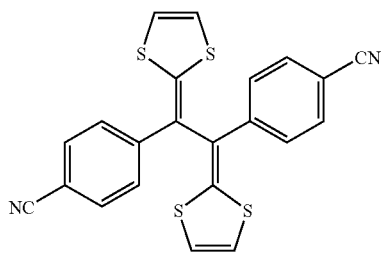

was used as the positive electrode active material, and the compound represented by the chemical formula (4):

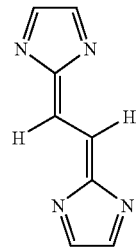

was used as the negative electrode active material.

Except that the above compounds were respectively used as the positive electrode active material and the negative electrode active material, the same coin-type cell was fabricated in the same manner as in EXAMPLE 1. Namely, in place of the compound represented by the chemical formula (3) and metallic lithium, the compound represented by the chemical formula (7) and the compound represented by the chemical formula (4) were respectively used to prepare two test electrodes, and the former test electrode was used as a positive electrode while the latter test electrode was used as a negative electrode, to fabricate a coin-type cell. The resultant coin-type cell was then charged/discharged at a constant current of 0.133 mA and at a voltage in the range of 0.3 to 0.6 V at an ambient temperature of 20° C. to determine discharge capacities at 1st, 50th, 100th and 300th cycles. The results are shown in Table 5.

TABLE 5

| | Discharge Capacity (mAh/g) | | | | Average discharge |
|---|---|---|---|---|---|
| | 1st | 50th | 100th | 300th | voltage (E/V vs. Li/Li$^+$) |
| Ex. 10 | 180 | 178 | 175 | 170 | 0.5 |

It is found from the results of Table 5 that an excellent cycle characteristic can be obtained even when the compound represented by the general formula (1) was used for both electrodes.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A secondary battery, comprising a positive electrode, a negative electrode and an electrolyte,
    wherein at least one of said positive electrode and said negative electrode includes an electrode active material comprising a polymer compound having a structure represented by the general formula (1a):

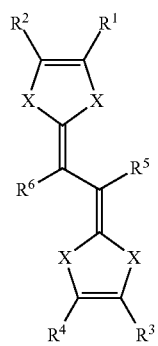

(1a)

where X is a sulfur atom or an oxygen atom; each of $R^1$ to $R^4$ is independently a linear or cyclic aliphatic group, a hydrogen atom, a hydroxyl group, a cyano group, an amino group, a nitro group or a nitroso group; each of $R^5$ and $R^6$ is independently a linear or cyclic aliphatic group, or a hydrogen atom; said aliphatic group includes at least one selected from the group consisting of an oxygen atom, a nitrogen atom, a sulfur atom, a silicon atom, a phosphorus atom, a boron atom, and a halogen atom, and wherein any from the group consisting of $R^3$, $R^4$, $R^5$ or $R^6$ is further bonded to another molecule in a polymer chain.

2. The secondary battery in accordance with claim 1, wherein said polymer compound contains more than one structure represented by the general formula (1a).

3. The secondary battery in accordance with claim 1, wherein said polymer compound has a polyacetylene chain or a polymethacrylate chain as a main chain.

4. The secondary battery in accordance with claim 1, wherein the number of carbon atoms in the aliphatic group is in the range of 1 to 6.

5. The secondary battery in accordance with claim 1, wherein said electrolyte comprises a solvent, and an anion and a cation that diffuse in said solvent, and said polymer compound is capable of forming a coordinate bond with said cation through an oxidation-reduction reaction.

6. The secondary battery in accordance with claim 5, wherein said cation is a lithium ion.

7. The secondary battery in accordance with claim 1, wherein said positive electrode includes said polymer compound as a positive electrode active material, and said negative electrode includes a carbon material as a negative electrode active material.

8. The secondary battery in accordance with claim 1, wherein said positive electrode includes said polymer compound as a positive electrode active material, and said negative electrode includes, as a negative electrode active material, at least one selected from the group consisting of a lithium metal, a lithium-containing composite nitride and a lithium-containing composite titanium oxide.

9. The secondary battery in accordance with claim 1, wherein said negative electrode includes said polymer compound as a negative electrode active material, and said positive electrode includes a metal oxide material as a positive electrode material.

10. The secondary battery in accordance with claim 1, wherein, when said polymer compound is used as an electrode active material, a conductive material is mixed into the electrode active material.

11. The secondary battery in accordance with claim 1, wherein, when said positive electrode includes said polymer compound as a positive electrode active material, one of the following is used as the negative electrode material of said negative electrode: a carbon material, a lithium metal, a lithium-containing composite nitride, a lithium-containing composite titanium oxide, a composite material of tin and carbon, and a composite material of tin and another metal.

12. The secondary battery in accordance with claim 1, wherein said polymer compound is a compound of general formula (9):

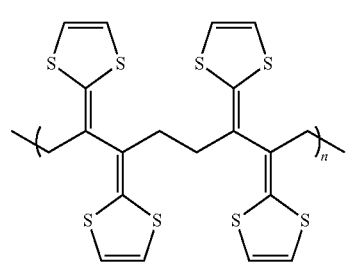

(9)

where n is not less than 1.

13. The secondary battery in accordance with claim 1, wherein said polymer compound is a compound of general formula (10):

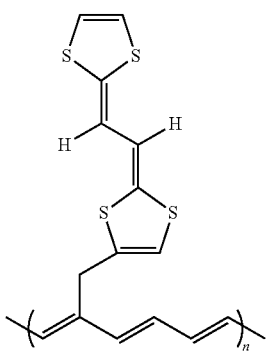

(10)

where n is not less than 1.

14. The secondary battery in accordance with claim 1, wherein said polymer compound has the following general formula:

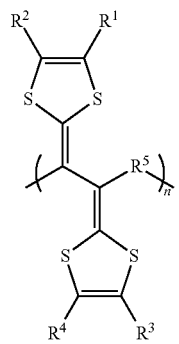

where n is not less than 1.

15. A secondary battery, comprising a positive electrode, a negative electrode and an electrolyte, wherein at least one of said positive electrode and said negative electrode includes an electrode active material comprising a compound having a structure represented by the general formula (9):

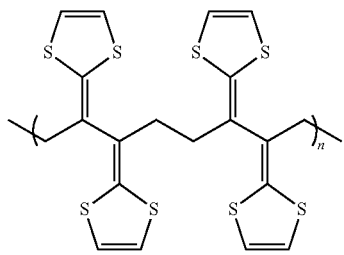

(9)

where n=4 to 10.

16. A secondary battery, comprising a positive electrode, a negative electrode and an electrolyte, wherein at least one of said positive electrode and said negative electrode includes an electrode active material comprising a compound having a structure represented by the general formula (10):

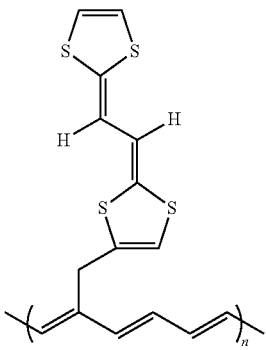

(10)

where n=4 to 10.

* * * * *